US006704267B2

(12) United States Patent
    Davidson

(10) Patent No.: US 6,704,267 B2
(45) Date of Patent: Mar. 9, 2004

(54) ATOMIC RESOLUTION STORAGE SYSTEMS WITH ENHANCED MAGNETIC FIELD PROTECTION

(75) Inventor: Robert J. Davidson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 557 days.

(21) Appl. No.: 09/815,785

(22) Filed: Mar. 23, 2001

(65) Prior Publication Data

US 2002/0135917 A1 Sep. 26, 2002

(51) Int. Cl.[7] .................................................. G11B 7/00
(52) U.S. Cl. ...................................................... 369/101
(58) Field of Search ............................... 369/100, 101, 369/126; 365/118, 128, 151; 250/298, 310, 311, 492.3, 515.1, 517.1, 518.1

(56) References Cited

U.S. PATENT DOCUMENTS 4,268,750 A * 5/1981 Cowart ..................... 250/315.3
5,185,530 A * 2/1993 Norioka et al. ............. 250/398
5,446,722 A * 8/1995 Kojima et al. .............. 369/266
5,557,596 A * 9/1996 Gibson et al. .............. 369/101
6,402,692 B1 * 6/2002 Morford ..................... 369/100

* cited by examiner

Primary Examiner—Thang V. Tran

(57) ABSTRACT

Memory storage devices that employ atomic resolution storage technology are provided. A preferred memory storage device includes a storage medium that defines one or more coverage areas. Each of the coverage areas incorporates a storage area that is configurable in one of a plurality of structural states. Typically, the structural states represent information stored in the storage area. Electron beam emitters electrically communicate with the storage medium, with the storage medium and the emitters being configured to move relative to each other. So configured, each emitter is capable of providing a beam of electrons to a respective one of the coverage areas. The memory storage device also includes a first current source that selectively electrically communicates with at least one of the emitters. Additionally, a shield is provided that is configured to reduce an influence of a magnetic field so that a tendency of an electron emitted from one of the emitters to be displaced from an intended trajectory is reduced. Methods also are provided.

20 Claims, 5 Drawing Sheets

ATOMIC RESOLUTION STORAGE SYSTEMS WITH ENHANCED MAGNETIC FIELD PROTECTION

BACKGROUND OF THE INVENTION

1. Field of the Invention

The present invention generally relates to data storage and, more specifically, to systems and methods for reducing the potential effect that magnetic fields, e.g., externally-generated magnetic fields, may have on data storage devices employing atomic resolution storage (ARS) techniques.

2. Background of the Invention

The apparent insatiability of consumers for higher capacity, higher speed memory storage devices has led to the development of memory storage techniques such as atomic resolution storage (ARS). As is known, a storage device employing ARS technology includes a number of electron emitters, such as field emitters, for example, that are adapted to write data to and read data from various storage areas of a storage medium.

During operation, an electron beam current is extracted from an emitter towards a corresponding storage area. Writing of data from an emitter to a storage area is accomplished by temporarily increasing the power density of the electron beam current to modify the structural state of the surface of the storage area. In contrast, reading data from the storage area is accomplished by observing the effect of the storage area on the electron beam of the emitter, or the effect of the electron beam on the storage area. More specifically, reading typically is accomplished by collecting secondary and/or backscattered electrons when an electron beam, i.e., an electron beam with a lower power density than that of the electron beam utilized for writing data to the storage area, is applied to the storage medium.

An ARS storage medium is formed of material characterized by a structural state that can be changed from crystalline to amorphous by a beam of electrons. Since the amorphous state has a different secondary electron emission coefficient (SEEC) and backscattered electron coefficient (BEC) than the crystalline state, a different number of secondary and backscattered electrons are emitted from each storage area, in response to an electron beam, depending upon the current structural state of that storage area. Thus, by measuring the number of secondary and backscattered electrons, the structural state of the storage area and, therefore, the data stored by the storage area, may be determined.

In order for an ARS storage device to function properly, a beam of electrons emitted by a particular emitter should directed so as to provide the electrons to an associated storage area. As the electrons of a beam of electrons provided from an emitter may be susceptible to changes in trajectory due to magnetic fields, such as externally-generated magnetic field, for example, such a magnetic field may cause errors in the ability of an ARS storage device to read data from and/or write data to a storage medium. For instance, a magnetic field may influence the trajectory of a beam of electrons so that the beam does not properly register with the associated storage area.

Therefore, there is a need for improved devices, systems, and methods that address these and/or other shortcomings of the prior art.

SUMMARY OF THE INVENTION

Briefly described, the present invention relates to atomic resolution storage (ARS) techniques. In this regard, embodiments of the present invention may be construed as providing memory storage devices that employ ARS technology. A preferred embodiment of the memory storage device includes a storage medium that defines one or more coverage areas. Each of the coverage areas incorporates a storage area that is configurable in one of a plurality of structural states. Typically, the structural states represent information stored in the storage area. Electron beam emitters electrically communicate with the storage medium, with the storage medium and the emitters being configured to move relative to each other. So configured, each emitter is capable of providing a beam of electrons to a respective one of the coverage areas.

The memory storage device also includes a shield disposed in proximity to the emitters. The shield is configured to reduce an influence of a magnetic field(s) so that a tendency of an electron emitted from one of the emitters to be displaced from an intended trajectory is reduced.

Some embodiments of the present invention may be construed as providing methods for reducing an influence of a magnetic field relative to a memory storage device. A preferred method includes the steps of providing a memory storage device and shielding electrons provided from the emitters from a magnetic field so that a tendency of an electron emitted from one of the emitters to be displaced from an intended trajectory is reduced.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention.

DETAILED DESCRIPTION OF A PREFERRED EMBODIMENT

Figure 1:
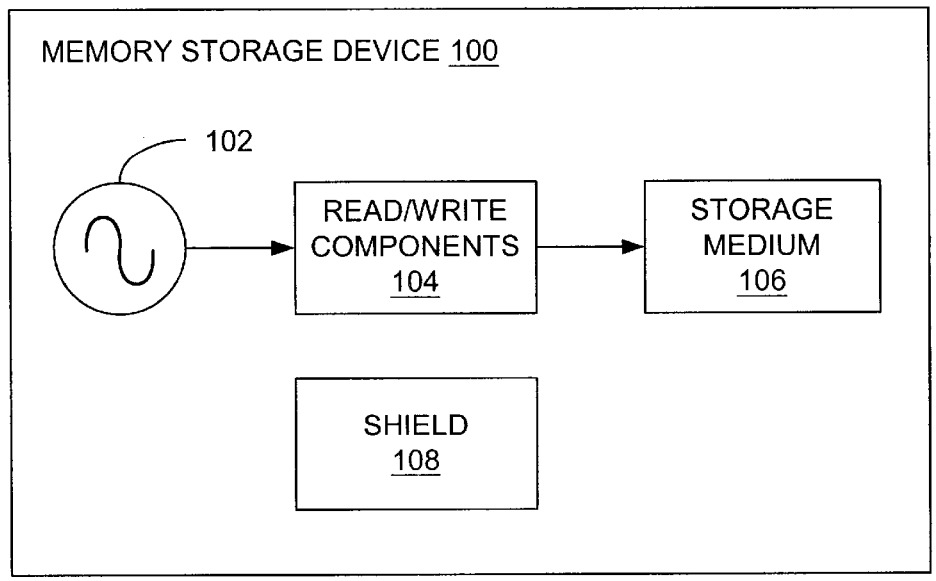
FIG. 1 is a schematic diagram of a preferred embodiment of the memory storage device of the present invention.

Reference will now be made to the drawings wherein like numerals indicate corresponding parts throughout the several views. As shown in FIG. 1, a preferred embodiment of the memory storage device 100 of the present invention includes a current source 102. Current source 102 provides current to read/write components 104 so as to enable reading of data from and/or writing of data to storage medium 106. Storage device 100 also includes a shield 108 that may be provided in various configurations, as described in detail hereinafter. Additionally, memory storage device 100 utilizes ARS technology for the storage and retrieval of data.

Figure 2:
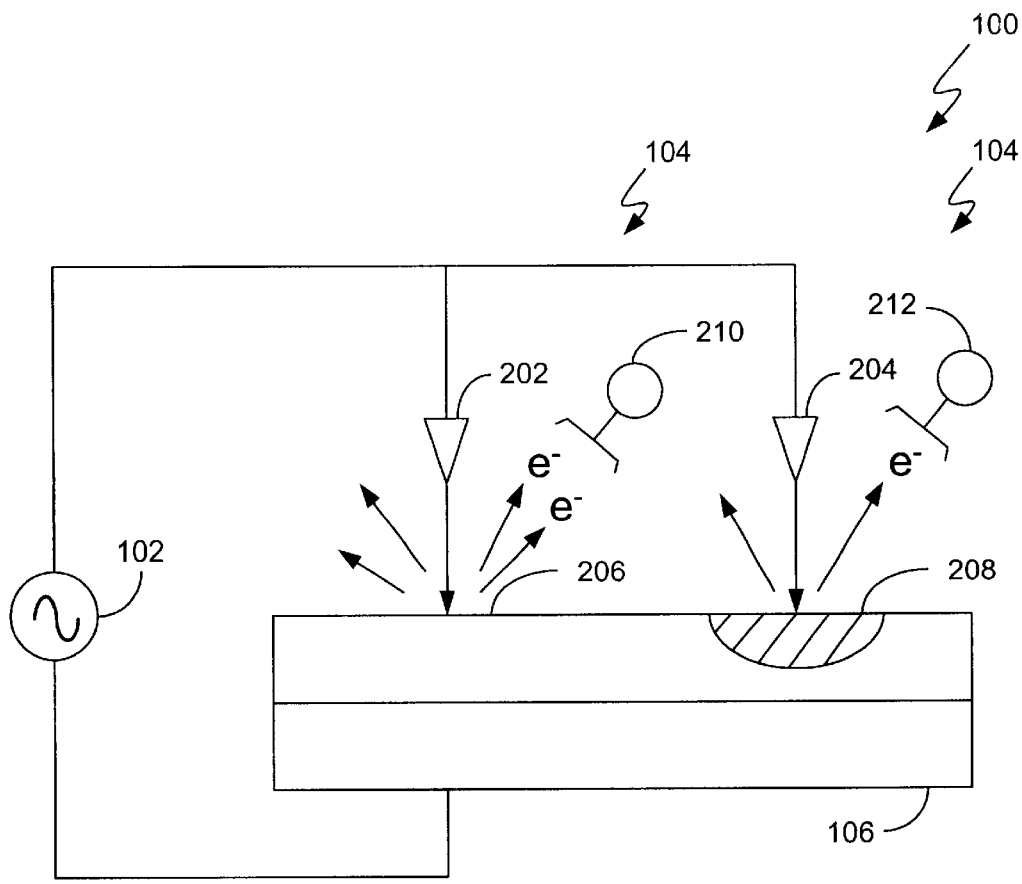
FIG. 2 is a schematic diagram illustrating an embodiment of the memory storage device of FIG. 1, with the emitters reading from the storage medium.

FIG. 2 schematically depicts a preferred embodiment of memory storage device 100 that employs ARS technology. In FIG. 2, representative emitters 202 and 204, e.g., field emitters, are shown reading from storage medium 106. In particular, emitter 202 is reading from storage area 206 and emitter 204 is reading from storage area 208. Storage areas 206 and 208 are provided with different structural states, as described hereinbefore. So provided, when electrons provided from a source, e.g., current source 102, are extracted from the emitters and into the respective storage areas, a different number of secondary electrons and/or backscattered electrons may be detected relative to each storage area. Detection of the secondary and/or backscattered electrons may be accomplished by electron collectors, e.g., collectors 210 and 212. As utilized herein, the term "read/write components" may be used to refer to an emitter(s) and/or an emitter(s) and its associated collector(s). Additionally, the term "emitter" is utilized herein as referring to any emitter configuration, such as a field emitter, ballistic emitter, quasi-ballistic emitter, flat emitter, etc.

In operation, the magnitude of a signal current collected by the electron collectors is monitored. Based upon the determined magnitude, the structural state of and, therefore, the data stored in the storage area may be identified. Typically, the data stored in a given storage area corresponds to a bit. It should be noted that the difference in the number of secondary electrons and/or backscattered electrons collected from one storage area, as compared to a storage area having a different structural state, may be greater or lesser depending upon the type of material and/or the type of modification made to the material.

Theory of Operation

The following analysis is intended to show that field exposure, e.g., exposure of a memory storage device employing ARS technology to magnetic fields, may produce an effect in such a device unless precautions are taken.

Figure 3:
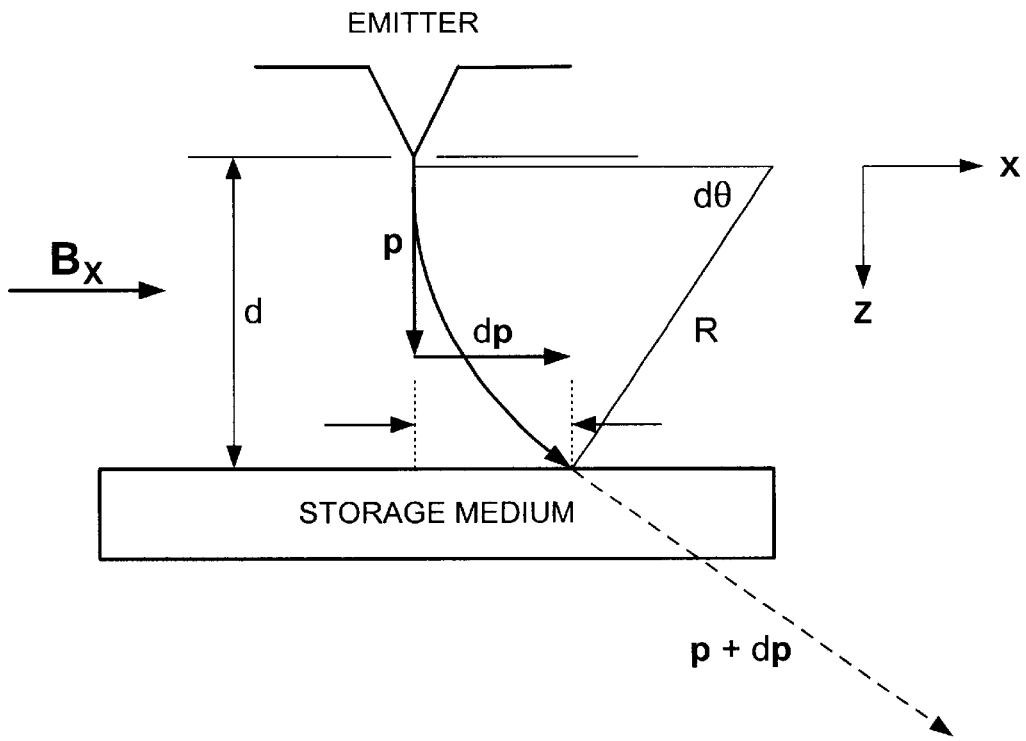
FIG. 3 is a schematic diagram depicting the trajectory of a representative electron that is influenced by a magnetic field.

The original source of the concern is that magnetic fields may interact with electrons emitted from emitters of a memory storage device as the electrons travel into storage media. Interaction is attributed to the Lorentz force, $F=q_e (v \times B)$. This force always acts perpendicular to the direction of motion of the electrons and, therefore, only changes the direction of travel, e.g., the energy and magnitude of the momentum remains constant. The only components of B that matter are those in-plane with the media (x, y components). Analysis of the $B_y$ component is given below, $B_x$ is the same. For this calculation, it is assumed that the electrons leave the emitter with 300 ev of energy and the tip-media spacing is 1 $\mu$m. Analysis of the effect of a constant magnetic field, By, shows that the electrons move in circles (helicics) of radius R (FIG. 3) given by the equation:

$$R = pc/3 \times 10^8 B_y \text{ meters,}$$

where pc is in ev and B is in w/m$^2$. Analysis of the geometry then yields:

$$\sin \theta = d/R = \Delta x/d,$$

which gives the offset due to the $B_y$ component:

$$\Delta x = d2/R = d^2 3 \times 10^8 B_y/pc$$

A magnetic field that can move the electron trajectory by 4 nm from nominal at the media (about 10% of the nominal spot size) is then given by:

$$B_y = pc\Delta x/3 \times 10^8 d^2 = 300(4 \times 10^{-9})/3 \times 10^8 (1 \times 10^{-6})^2 = 4 \times 10^{-3} \text{ W}/m^2 = 40 Oe.$$

Given the magnitude of this result, it seems that practical sized fields (i.e., fields commonly encountered) could have an effect on the performance of an ARS device if no shielding is provided.

Representative Examples

Figure 4:
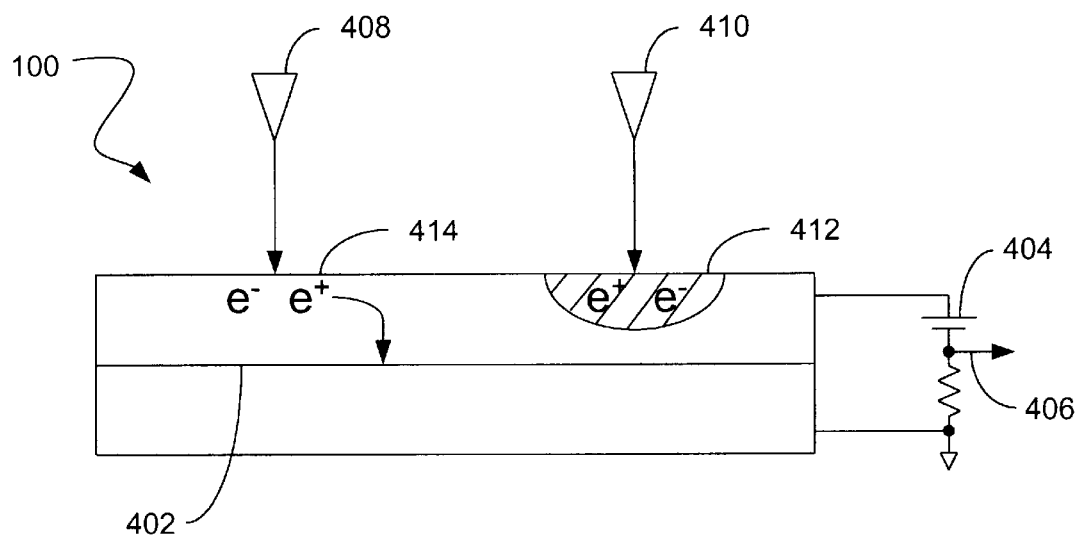
FIG. 4 is a schematic diagram illustrating an embodiment of the memory storage device of FIG. 1, with the emitters reading from the storage medium.
Figure 5:
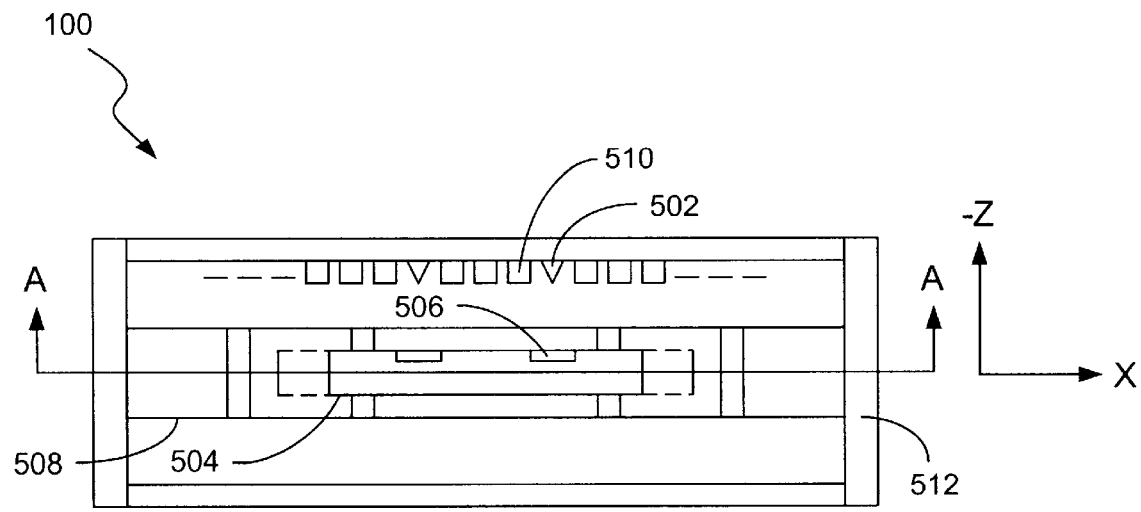
FIG. 5 is a schematic diagram illustrating a preferred embodiment of the memory storage device of FIG. 1.
Figure 6:
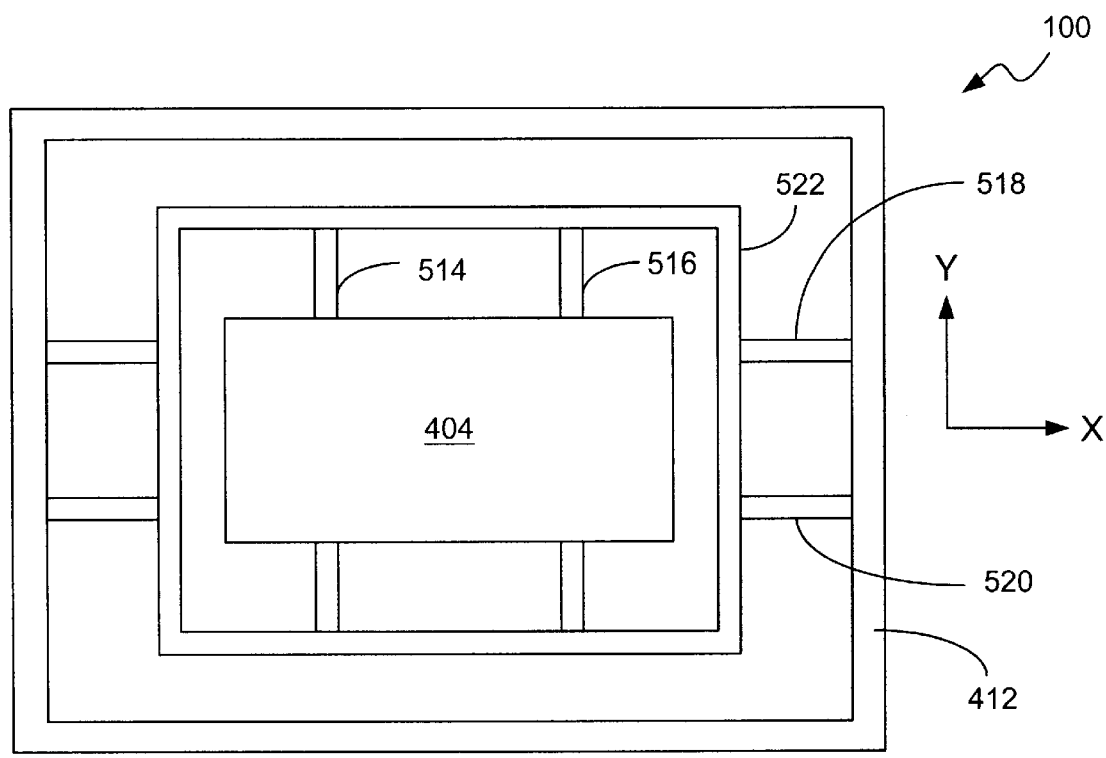
FIG. 6 is a schematic diagram illustrating the memory storage device of FIG. 4, as viewed along section line A—A.

Referring now to FIGS. 4 through 6, other embodiments of ARS systems that may implement the present invention will be described in greater detail. These figures are disclosed and described in U.S. Pat. No. 5,557,596, which is hereby incorporated by reference in its entirety. It should be noted, however, that the ARS systems shown and described herein are not the only ARS systems to be utilized with the present invention. To the contrary, the present invention may be utilized with various types and configurations of ARS systems provided that such a system is capable of writing data to and/or reading data from a storage medium.

FIG. 4 schematically depicts a technique for writing data to and/or reading data from an ARS storage area. As shown in FIG. 4, storage medium 400 is based on a diode structure, which may be a PN junction, a Schottky, barrier, or any other type of electronic valve. Data is stored by locally altering the surface of the diode in such a way that collection efficiency for minority carriers generated by the altered region is different from that of an unaltered region. The collection efficiency for minority carriers is defined as the fraction of minority carriers generated by the instant electrons which are swept across the diode junction 402 when it is biased by an external circuit 404 to cause a signal current 406 to flow in the external circuit. Although FIG. 4 illustrates a preferred external circuit 404, it will be appreciated that this circuit is provided for purposes of example only.

In operation, the emitters 408 and 410 emit narrow beams of electrons onto the surface of the diode 400. The incident electrons excite electron-hole pairs near the surface of the diode. Because the diode is reverse-biased by the external circuit 404, minority carriers that are generated by the incident electrons are swept toward the diode junction 402. Electrons that reach the junction 402 are then swept across the junction. Accordingly, minority carriers that do not recombine with majority carriers before reaching the junction are swept across the junction, causing a current flow in the external circuit 404.

Writing to the diode 400 is accomplished by increasing the power density of the electron beam enough to locally alter the physical properties of the diode. This alteration affects the number of minority carriers swept across the junction 402 when the same area is radiated with a lower power density (read) electron beam. For instance, the recombination rate in a written area 412 could be increased relative to an unwritten area 414 so that the minority carriers generated in the written area 412 have an increased probability of recombining with minority carriers before they have a chance to reach and cross the junction 402. Hence, a smaller current flows in the external circuit 404 when the read electron beam is incident upon a written area 412 than when it is incident upon an unwritten area 414. Conversely, it is also possible to start with a diode structure having a high recombination rate and to write bits by locally reducing the recombination rate. In such an embodiment, the magnitude of the current resulting from the minority carriers depends upon the state of the storage area and the current continues the output signal to indicate the bit stored.

FIGS. 5 and 6 illustrate an embodiment of memory storage device 100. In this regard, FIG. 5 shows a side, cross-sectional view of memory storage device 100, which includes a number of field emitters 502, a storage medium 504 that incorporates a number of storage areas 506, and a micromover 508 that scans the storage medium with respect to the field emitters or vice versa. In a preferred embodiment, each storage area 506 is responsible for storing one bit of information. As mentioned hereinbefore, the field emitters are responsible for reading data from and/or writing data to the storage areas by utilizing electron beams. Thus, field emitters suitable for the present invention preferably are of the type that produce electron beams which are narrow enough to achieve the desired bit density of the storage medium, and which provide the power density of the beam current needed for reading from and writing to the storage medium. As mentioned hereinbefore, however, in other applications, various other emitter types may be utilized.

During operation, a predetermined potential difference is applied between a field emitter 502 and a corresponding gate, such as a circular gate 510, which surrounds the emitter. So provided, an electron beam current is extracted from the emitter 502 towards the storage area 506. Depending upon the distance between the emitters 502 and the storage medium 504, the type of emitters, and the spot size (e.g., bit size) required, electron optics may be useful in focusing the electron beams. Voltage also may be applied to the storage medium 504 to either accelerate or decelerate the emitted electrons or to aid in focusing the emitted electrons. A casing 512 also may be provided which maintains the storage medium 504 in a partial vacuum.

FIG. 6 shows a top view of the cross-section A—A of FIG. 5 and illustrates the storage medium 504 being held by two sets of thin-walled microfabricated beams 614 and 616, and 618 and 620. Although a beam-type micromover is shown and described herein, various other types and configurations of micromovers may be utilized by the present invention. Faces of the first set of thin-walled beams, i.e., 614 and 616, are in the X–Z plane. This set of beams may be flexed in the X direction allowing the storage medium 504 to move in the X direction with respect to the casing 512. Faces of the second set of thin-walled beams, i.e., 618 and 620, are in the X–Z plane. This set of beams allows the storage medium 504 to move in the Y direction with respect to the casing 512. The storage medium is held by the first set of beams to a frame 622. The frame is held by the second set of beams to the casing 512. Thus, the field emitters may scan over the storage medium 504, or the storage medium may scan over the field emitters, in the X–Y directions by electrostatic, electromagnetic, piezoelectric or other suitable methods and/or mechanisms.

Figure 7:
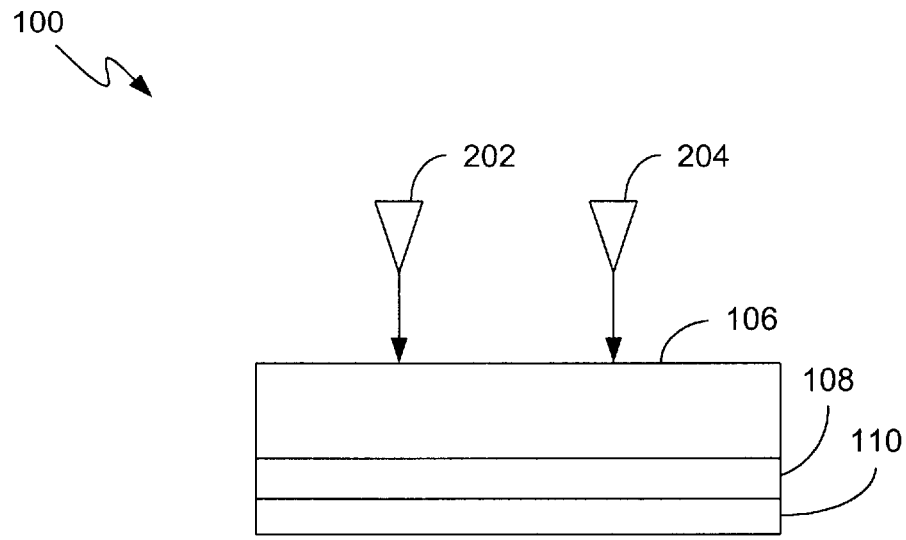
FIG. 7 is a schematic diagram depicting an embodiment of the storage device of FIG. 1.

As shown in FIG. 7, memory storage device 100 may incorporate a shield 108 that is adapted to reduce the potential for magnetic fields to induce a misregistration of electrons provided from an emitter(s), e.g., emitter 202 and/or 204. More specifically, shield 108 is intended to prevent a magnetic field(s) from altering the path of electrons provided from one or more of the emitters so that the electrons from the beam may be provided to an appropriate portion of storage medium 106. In the embodiment of the shield depicted in FIG. 7, the shield is disposed on a side of the storage medium opposing the emitters, although various other arrangements of shields may be utilized.

In FIG. 7, shield 108 may be configured as a planar sheet of material that is attached, e.g., glued, to a component of the memory storage device. By way of example, shield 108 may be attached directly to storage medium 106 or, in other embodiments, the shield may be attached to components disposed between the storage medium and the shield.

As shield 108 is characterized by an effective range, e.g., a distance at which, if exceeded, the shield does not provide the desired effect, it is oftentimes desirable to place the shield in close proximity to the electron beam(s) that is to be shielded. By placing the shield close to the electron beam(s), other advantages also may be achieved. For instance, reducing the spacing between the shield and the electron beam may permit a shield of a reduced size to be utilized. The reduced size, in turn, may yield a reduction in material usage for forming the shield, and may provide a reduced weight, thereby potentially enabling the formation of smaller, less costly, and/or lighter memory storage devices.

Various materials may be suitable for use a shield. By way of example, it may be desirable in some embodiments to utilize a material possessing a relative magnetic permeability of greater than approximately 100 to 200 (cgs). Due to the anticipated arrangement of emitters relative to a storage medium, a lower relative magnetic permeability may result in a weakened shield, whereas a much greater relative magnetic permeability may not provide a significant relative improvement in shielding capability. Some representative examples of suitable materials for forming the shield include, but are not limited to, mumetal, nickel-iron, and CZT, for example.

Figure 8:
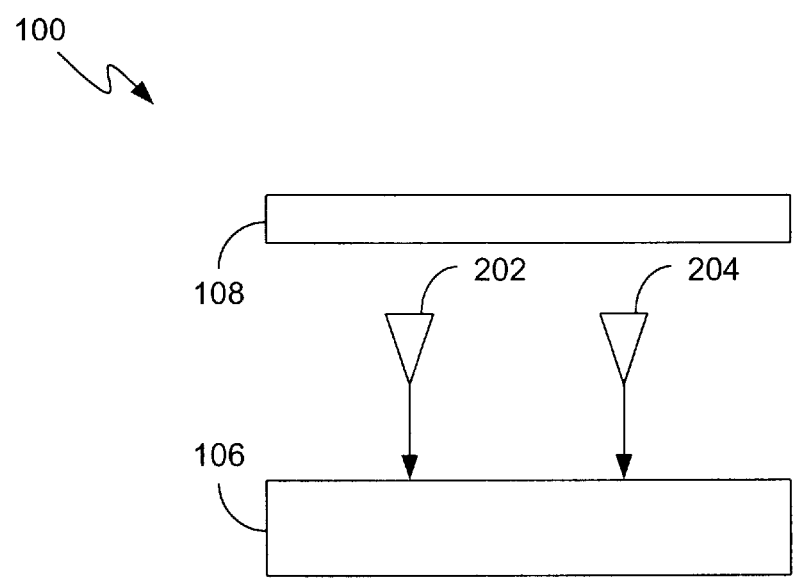
FIG. 8 is a schematic diagram depicting an embodiment of the storage device of FIG. 1.
Figure 9:
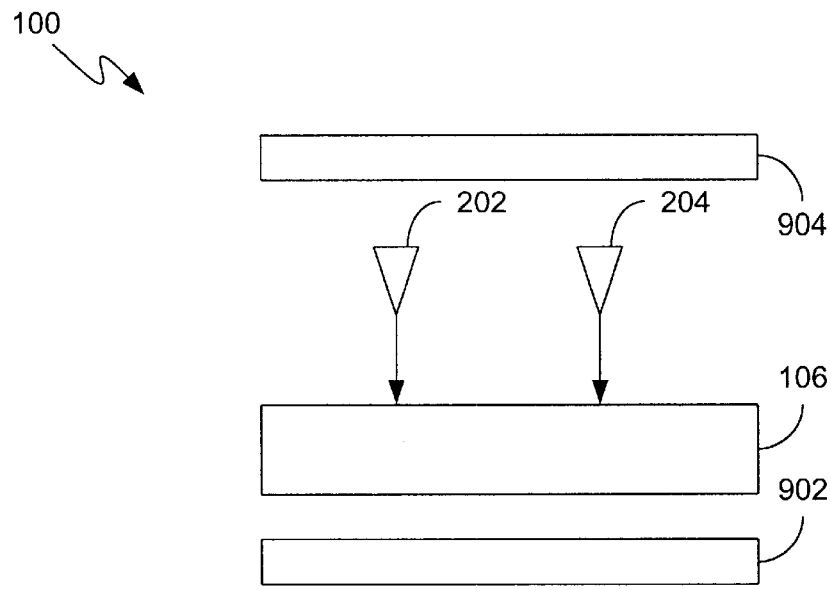
FIG. 9 is a schematic diagram depicting an embodiment of the storage device of FIG. 1.
Figure 10:
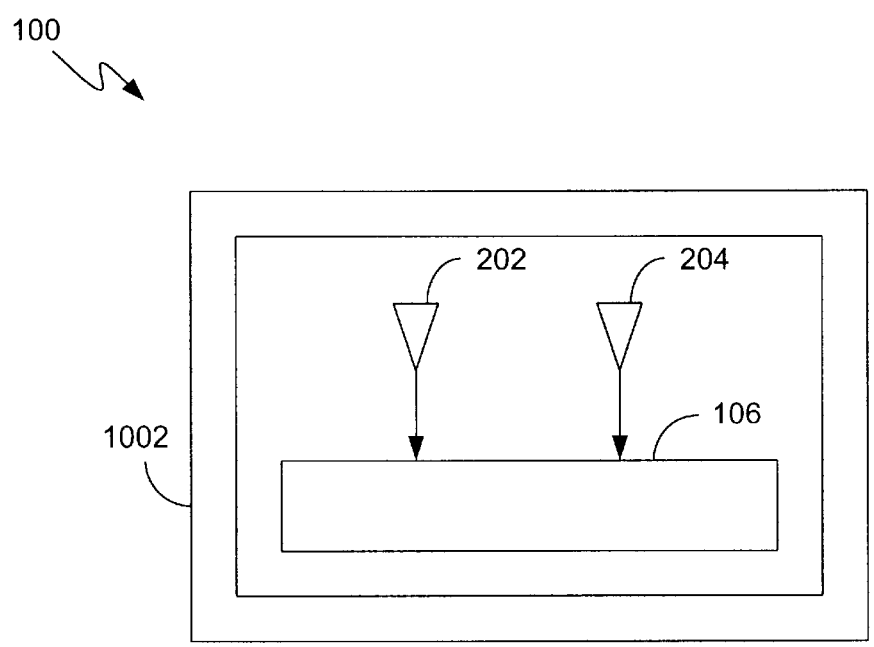
FIG. 10 is a schematic diagram depicting an embodiment of the storage device of FIG. 1.

As mentioned briefly hereinbefore, one or more shields may be provided in numerous configurations, including a thin sheet(s) of material attached to one or more components of the memory storage device, e.g., see FIGS. 7, 8, and 9, and an enclosure formed of shielding material that is provided to surround an electron beam(s), e.g., see FIG. 10.

In regard to the use of materials provided in the form of a film, these materials may have a tendency to form magnetic domains. Of particular concern is the potential for the magnetic domains to possess different magnetic properties and, thereby potentially self-generate magnetic fields. Since these self-generated magnetic fields may have a tendency to cause misregistration effects relative to the electron beams of the memory storage device, a stabilization layer 110 (FIG. 7) may be provided. Such a stabilization layer, if utilized, should be adapted to form an exchange coupling with the material of the shield, so as to lock a particular magnetic configuration into the shield. In some embodiments, a weak exchange coupling may be preferable so as to enable the material of the shield to be reactive to external magnetic fields. Although various materials may be utilized for forming a stabilization layer(s), anti-ferro magnetic materials and cobalt nickel, are to be considered representative examples of materials that may be utilized.

Referring now to the embodiment depicted in FIG. 9, it is shown that multiple shield components, e.g., shield components 902 and 904, may be provided. More specifically, in the embodiment depicted in FIG. 9, shield component 902 is disposed on a side of storage medium 106 that opposes emitters 202 and 204, and shield component 904 is arranged so that the emitters are disposed between the storage medium and shield component 904. In some embodiments, shield components 902 and 904 may be provided as generally planar structures. Theoretically, if the shield components are suitably sized, as would be readily known as one of ordinary skill in the art, a high relative degree of shielding may be provided to electron beams provided that such beams are not arranged in close proximity to the periphery of the storage medium.

As shown in the representative embodiment of FIG. 10, for those embodiments that may require a higher degree of shielding, shield 1002 may be provided so as to fully encase the electron beams of the memory storage device 100. Such a shield may be provided in one or more of various locations relative to the electron beams of such a device. By way of example, the shield may be disposed about only the emitters and storage medium, whereas, in other embodiments, the shield may encase more components of the device(s).

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A memory storage device comprising:
    a storage medium having a plurality of coverage areas, each of said coverage areas having a storage area associated therewith, each of said storage areas being configurable in one of a plurality of structural states to represent information stored in said storage area;
    a plurality of electron beam emitters configured to electrically communicate with said storage medium, said storage medium and said plurality of emitters being configured to move relative to each other such that each of said emitters is capable of providing a beam of electrons to a respective one of said coverage areas of said storage medium;
    a first current source configured to enable the at least one of said emitters to provide a beam of electrons to a respective one of said coverage areas; and
    a shield disposed in proximity to said plurality of emitters, said shield being configured to reduce an influence of a magnetic field such that a tendency of an electron emitted from one of said emitters to be displaced from an intended trajectory is reduced.

2. The memory storage device of claim 1, wherein said shield is disposed on a side of said storage medium opposing said emitters.

3. The memory storage device of claim 1, wherein said shield comprises a first shield component and a second shield component, and wherein said emitters and said storage medium are disposed between said first shield component and a second shield component.

4. The memory storage device of claim 1, wherein said shield is configured as a substantially planar member.

5. The memory storage device of claim 1, wherein said shield is configured as an enclosure for surrounding said emitters and said storage medium.

6. The memory storage device of claim 1, wherein at least one of said emitters is a field emitter.

7. The memory storage device of claim 1, wherein the magnetic field originates external to said memory storage device.

8. The memory storage device of claim 1, wherein said shield is formed of a material having a relative magnetic permeability of greater than approximately 100 (cgs).

9. The memory storage device of claim 1, wherein said shield is formed of a material having a relative magnetic permeability of less than approximately 200 (cgs).

10. The memory storage device of claim 1, further comprising:
    a stabilization layer arranged adjacent to at least a portion of said shield, said stabilization layer being configured to form an exchange coupling with said shield such that said exchange coupling tends to reduce a tendency of said shield to exhibit multiple magnetic domains.

11. The memory storage device of claim 1, further comprising:
    means for reducing a tendency of said shield to exhibit multiple magnetic domains.

12. The memory storage device of claim 2, wherein said shield is attached to said storage medium.

13. The memory storage device of claim 3, wherein said first shield component is attached to said storage medium.

14. The memory storage device of claim 8, wherein said shield comprises mumetal.

15. The memory storage device of claim 10, wherein said a stabilization layer comprises an anti-ferromagnetic material.

16. The memory storage device of claim 12, further comprising:
    a layer of adhesive disposed between said shield and said storage medium.

17. The memory storage device of claim 12, further comprising:
    means for adhering said shield to said storage medium.

18. A method for reducing an influence of a magnetic field relative to a memory storage device, said method comprising the steps of:
    providing a memory storage device having a storage medium and a plurality of electron beam emitters configured to electrically communicate with the storage medium, the storage medium and the plurality of emitters being configured to move relative to each other such that each emitter may provide a beam of electrons within a respective coverage area of the storage medium, each coverage area having a storage area formed therein being configurable in one of a plurality of structural states to represent information stored in the storage area; and
    shielding electrons provided from the emitters from a magnetic field such that a tendency of an electron emitted from one of said emitters to be displaced from an intended trajectory is reduced.

19. The method of claim 18, wherein the step of shielding comprises the step of:
    disposing a shield in proximity to said plurality of emitters, the shield being configured to reduce an influence of the magnetic field.

20. The method of claim 19, wherein the step of disposing comprises the step of:
    adhering the shield to the storage medium.

* * * * *